United States Patent
Wilhelm et al.

(10) Patent No.: US 11,313,444 B2
(45) Date of Patent: Apr. 26, 2022

(54) THREADED NUT OF A BALL SCREW DRIVE

(71) Applicant: Schaeffler Technologies AG & Co. KG, Herzogenaurach (DE)

(72) Inventors: Sigurd Wilhelm, Herzogenaurach (DE); Dieter Adler, Schönwald (DE); Ernst Strian, Kunreuth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/648,355

(22) PCT Filed: Jul. 23, 2018

(86) PCT No.: PCT/DE2018/100659
§ 371 (c)(1),
(2) Date: Mar. 18, 2020

(87) PCT Pub. No.: WO2019/057234
PCT Pub. Date: Mar. 28, 2019

(65) Prior Publication Data
US 2020/0224753 A1    Jul. 16, 2020

(30) Foreign Application Priority Data
Sep. 21, 2017 (DE) ................. 10 2017 121 942.0

(51) Int. Cl.
*F16H 25/24* (2006.01)
*B60T 13/10* (2006.01)
(Continued)

(52) U.S. Cl.
CPC .............. *F16H 25/24* (2013.01); *B60T 13/10* (2013.01); *B60T 13/745* (2013.01); *C22C 38/02* (2013.01);
(Continued)

(58) Field of Classification Search
CPC ...... F16H 25/22; F16H 25/2204; F16H 25/24; F16H 2025/249; C22C 38/40; C22C 38/44; C22C 38/18; C22C 38/20–60
See application file for complete search history.

(56) References Cited

U.S. PATENT DOCUMENTS

| 5,843,369 A | 12/1998 | Obara et al. |
| 2003/0221502 A1* | 12/2003 | Okita ................ F16H 25/2238 74/424.88 |
| 2020/0095649 A1* | 3/2020 | Cha ........................ C22C 38/42 |

FOREIGN PATENT DOCUMENTS

| CN | 103507801 A | 1/2014 |
| CN | 104822577 A | 8/2015 |

(Continued)

OTHER PUBLICATIONS

"Kugelgewinde für die Luft-und Raumfahrt," Firma Steinmeyer, 2016, pp. 134-137.

(Continued)

*Primary Examiner* — Randell J Krug
(74) *Attorney, Agent, or Firm* — Matthew Evans

(57) ABSTRACT

A threaded nut of a ball-screw for a brake booster is constructed as a hydraulic piston and is produced from the group of martensitically hardening steels which are non-corroding with respect to brake fluid and which has in percent by weight: between 0.4% and 1.3% carbon (C), up to 2% silicon (Si), up to 2% manganese (Mn), between 12% and 20% chromium (Cr), and phosphorus (P) and sulphur (S) together at less than 0.015%, the balance being iron and, where applicable, melting-related impurities. Addition of the following materials to the above-described steel may be advantageous: up to 2% molybdenum (Mo), up to 0.2% vanadium (V), and up to 3% nickel (Ni).

14 Claims, 2 Drawing Sheets

(51) Int. Cl.
*B60T 13/74* (2006.01)
*C22C 38/02* (2006.01)
*C22C 38/04* (2006.01)
*C22C 38/22* (2006.01)
*C22C 38/24* (2006.01)
*C22C 38/38* (2006.01)
*C22C 38/44* (2006.01)
*C22C 38/46* (2006.01)
*C22C 38/58* (2006.01)
*F16D 65/14* (2006.01)
*F16H 25/22* (2006.01)
*F16D 125/40* (2012.01)

(52) U.S. Cl.
CPC .............. *C22C 38/04* (2013.01); *C22C 38/22* (2013.01); *C22C 38/24* (2013.01); *C22C 38/38* (2013.01); *C22C 38/44* (2013.01); *C22C 38/46* (2013.01); *C22C 38/58* (2013.01); *F16D 65/14* (2013.01); *F16H 25/2204* (2013.01); *C21D 2211/008* (2013.01); *F16D 2125/40* (2013.01); *F16H 2025/2481* (2013.01)

(56) References Cited

FOREIGN PATENT DOCUMENTS

| | | | |
|---|---|---|---|
| DE | 4235842 A1 | 4/1994 | |
| DE | 102004043134 A1 | 3/2006 | |
| DE | 102012217092 A1 * | 3/2013 | ............ B60T 13/745 |
| DE | 102012217092 A1 | 3/2013 | |
| EP | 2759589 A1 | 7/2014 | |
| JP | 11264016 A * | 9/1999 | |
| JP | H11264016 A | 9/1999 | |
| JP | 2000328204 A | 11/2000 | |
| JP | 2007211940 A | 8/2007 | |
| JP | 2008025727 A | 2/2008 | |

OTHER PUBLICATIONS

"Datenblatt Cronidur Wst.-Nr.: 1.4108," Energietechnik-Essen, 2012, pp. 1-4, Germany.

Author: Zhang, Jianmin, Source: Mechatronics System Design, Beijing University of Technology Press, Country: China.

* cited by examiner

THREADED NUT OF A BALL SCREW DRIVE

CROSS-REFERENCE TO RELATED APPLICATIONS

This application is the U.S. National Phase of PCT Appln. No. PCT/DE2018/100659 filed Jul. 23, 2018, which claims priority to DE 10 2017 121 942.0 filed Sep. 21, 2017, the entire disclosures of which are incorporated by reference herein.

TECHNICAL FIELD

The present disclosure relates to a threaded nut of a ball screw drive and ball screw drives. Such drives convert a rotational movement into a translational movement. The disclosure also relates to electrohydraulic brakes and brake boosters, in which such ball screw drives are used to produce a hydraulic operating pressure. Ball screw drives are preferably actuated in an electromotive manner. Either the threaded nuts or the threaded spindles may be rotationally driven.

BACKGROUND

DE102012217092 A1 discloses a brake booster which has a ball screw drive. The threaded nut of the ball screw drive is constructed as a piston, whose outer covering face is constructed as an outer cylindrical sealing face. Acting as a piston element, the threaded nut must also perform the sealing function and be corrosion-resistant with respect to aggressive media such as brake fluid. Furthermore, it must as a gear element have a permanent roller bearing function (rolling strength) in order to achieve a defined service-life under high stress to ensure the rolling of the balls of the ball screw drive on the ball grooves of the threaded nut and the threaded spindle.

From the brochure "Kugelgewindetriebe für die Luft- and Raumfahrt" ("Ball screw drives for air and space travel") from the company Steinmeyer, 2016, a ball screw drive is known whose spindle shaft can be produced from a high-strength steel such as Cronidur or 1.4108 (AMS5898). In this instance, the thread of the spindle shaft is produced by means of spinning.

Cronidur is a material which is produced and can be processed in a technologically very complex manner and which has only limited suitability from an economic point of view for large-scale production in automotive manufacture. The main characteristic involves melting with simultaneous alloying of pressurized nitrogen (DESU). This material requires further processing in a high degree of specialized processes. In specific applications such as with highly rotating spindle bearings, during metal on metal rolling contact a high level of wear has been disadvantageously observed in the region of the contact marks compared with conventional applications. In safety-relevant applications, such as brake boosters of motor vehicles, this material may be subject to high levels of wear during rolling contact.

SUMMARY

A threaded nut of a ball screw drive which is both sufficiently roll-resistant and suitable for contact with brake fluid is desirable.

The threaded nut which is constructed as a hydraulic piston is produced from the group of martensitically hardening steels which are non-corroding with respect to brake fluid and which has in percent by weight: between 0.4% and 1.3% carbon (C), up to 2% silicon (Si), up to 2% manganese (Mn), between 12% and 20% chromium (Cr), and phosphorus (P) and sulphur (S) together at less than 0.015%, the balance being iron and where applicable melting-related impurities.

This threaded nut with the alloy elements given has the corrosion resistance required for the application. Consequently, the threaded nut which is produced from the rust-resistant and acid-resistant steel and which is martensitically hardened is characterized by the corrosion resistance thereof against brake fluid and adequate rolling strength.

By using the corrosion-resistant material, it is no longer necessary to apply a corrosion protection using chemical and galvanic thin layer corrosion protection systems. This threaded nut consequently has no property gradients, but instead a uniform property profile which is advantageous for shaping operations which take place after the thermal processing. As a result of the omission of the galvanic or chemical coating processes, hydrogen absorption is prevented. There is consequently no risk of hydrogen embrittlement.

The threaded nut is provided with a ball groove which is constructed on the inner periphery and which is wound helically about a spindle axis of the ball screw drive and is constructed as a hydraulic piston. This hydraulic piston may, for example, be a component of an electro-hydraulic brake booster and may cooperate with a cylinder.

The steel ensures on the one hand the required rolling strength with a view to the rolling of the balls on the ball groove. On the other hand, adequate corrosion resistance is provided against brake fluid, to which the threaded nut may be exposed during its function as a hydraulic piston of a brake booster. Particular coatings of the threaded nut as a corrosion protection can be dispensed with.

The material is derived from an ordinary steel as used for the cutting tool industry, in particular blades. As a result of modifications for the specific requirement profile as an actuator in a brake booster system, this steel is taking into account the market requirements in the motor vehicle sector.

The production of the material is carried out in conventional manner and does not involve any melting method or alloying of nitrogen. The optimization relates in particular to the aspect of a controlled micro purity degree as a result of the limitation of the phosphorus and sulphur content to less than 0.015%. This limitation reduces the wear during rolling contact and improves the processing possibilities of the threaded nut.

Furthermore, the threaded nut provides as a result of the composition of the used steel sufficient hardenability with a view to functional requirements during rolling contact with a uniform and small carbide size on the surface. Furthermore, the resistance in the operating medium brake fluid is provided to a sufficient degree with the functionally still permissible water content.

Preferably with a steel from the group of martensitically hardenable rust-resistant and acid-resistant steels after a thermal processing operation, a martensitically hardened steel with a minimum hardness of 55 HRC is ensured.

With regard to the application, the addition of the following materials to the above-described steel may be advantageous: molybdenum (Mo) at up to 2.0%, vanadium (V) at up to 0.2%, and nickel (Ni) at up to 3.0%. Percentages are given in percent by weight.

The oxidic and sulphidic purity degree is ensured when using steels for roller bearing applications.

The steel may originate from the series of rust-resistant and acid-resistant steels: based on the designation system of the steels according to EN 10027 in particular from the series 1.40xx and 1.41xx and 1.45xx and also from the series of corrosion-resistant roller bearing steels from the series 1.35xx. In this instance, the following steels are particularly advantageous for the production of the threaded nut: 1.3541, 1.3542, 1.3543, 1.3549, 1.4034, 1.4037, 1.4109, 1.4110, 1.4111, 1.4112, 1.4116, 1.4117, 1.4125, 1.4535.

Comparable steels may have other designations in other national and international standard systems. They have in common that with the composition they have sufficient protection from corrosion in brake fluids in order to comply with the function of required hardness.

For a steel, it is ensured that any primary carbides which may occasionally be present do not result in a negative impairment of the rolling strength, comparable with the influence of the oxidic and sulphidic purity degree.

A ball screw drive is provided with the threaded nut, wherein there are arranged between a threaded spindle and the threaded nut balls which roll on ball grooves of the threaded spindle and the threaded nut, wherein the threaded nut is constructed as a hydraulic piston for cooperating with a cylinder.

An advantageous development makes provision for the threaded spindle to be produced from a steel whose chromium content is less than 12% by weight. 16MnCr5 and 100Cr6 are preferably suitable as steel and are both from an economic viewpoint cheaper than the steel used for the threaded nut. This combination of steels is advantageous when only the nut has to have specific requirements in terms of the corrosion resistance. This may be the case with a brake booster in whose cylinder the threaded nut which is constructed as a hydraulic piston is in contact with aggressive brake fluid. The threaded spindle is arranged in a space which no brake fluid reaches.

A brake booster has the ball screw drive whose threaded nut is arranged in the cylinder so as to be able to be longitudinally displaced in order to carry out piston strokes and whose threaded spindle is rotatably driven.

An outer covering face of the threaded nut may be constructed as an outer cylindrical sealing face. There may abut this sealing face, for example, a seal which engages around the threaded nut. This seal may be constructed as a sealing ring.

It may be advantageous to also produce the threaded spindle from one of the above-described steels. This may in particular be indicated when the threaded spindle also comes into contact with brake fluid.

BRIEF DESCRIPTION OF THE DRAWINGS

Two embodiments are explained in greater detail below with reference to four Figures. In the drawings.

DETAILED DESCRIPTION

Figure 1:
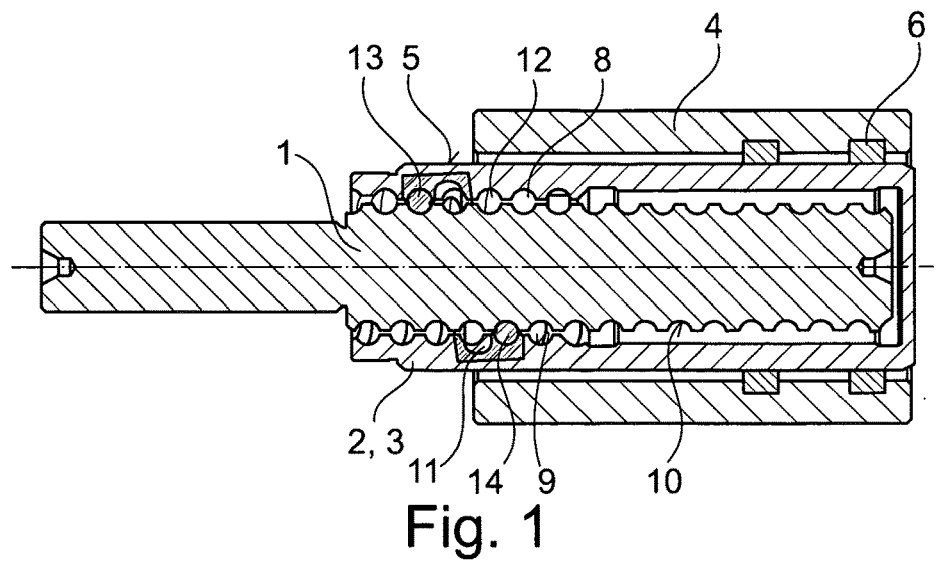
FIG. 1 is a longitudinal section through a ball screw drive in a first position.
Figure 2:
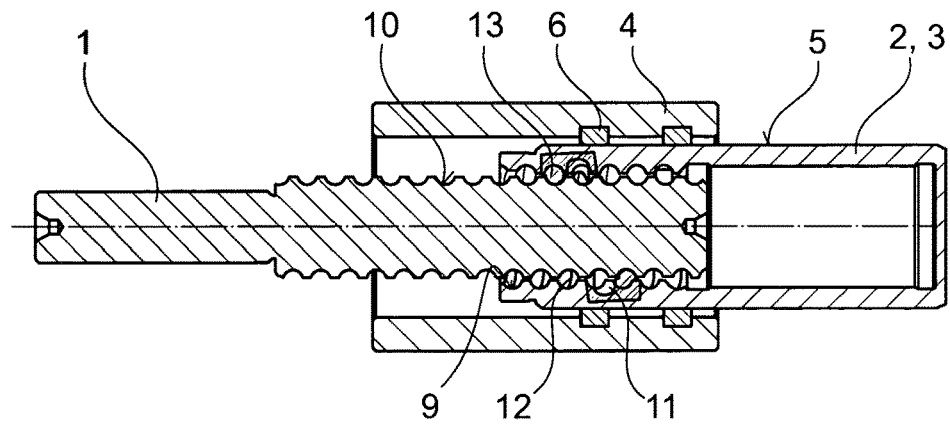
FIG. 2 is a longitudinal section through the ball screw drive from FIG. 1 in a second position.

FIGS. 1 and 2 show a first embodiment of a ball screw drive which has a rotatably driven threaded spindle 1 and a threaded nut 2 which is arranged in an axially displaceable manner on the threaded spindle 1. FIG. 1 shows the ball screw drive with a retracted threaded nut 2 and FIG. 2 shows it with a deployed threaded nut 2.

The threaded nut 2 is constructed as a piston 3 which engages in a cylinder 4 which is only indicated. In place of a cylinder, a housing may be provided. The outer covering face of the threaded nut 2 is constructed as a cylindrical sealing face 5 of the piston 3. Not illustrated is a hydraulic pressure chamber which is delimited by the piston 3 and the cylinder 4. This pressure chamber adjoins the right end of the cylinder 4. When the ball screw drive is actuated—that is to say, when the threaded spindle 1 is rotatably driven—the piston 3 is displaced axially with respect to the cylinder 4 and consequently the pressure chamber is increased or reduced.

The pressure chamber is filled with brake fluid. This means in particular the threaded nut 2 which is constructed as a hydraulic piston is in contact with the brake fluid. The threaded spindle 1 is arranged outside the space which is in contact with brake fluid. The threaded nut 2 also has in addition to the required rolling strength the required corrosion resistance with respect to brake fluid. Particular coating systems as corrosion protection are not required.

There are arranged on the inner periphery of the cylinder 4 two axially adjacent sealing rings 6 which abut in a sealing manner against the cylindrical sealing face 5 of the piston 3 and which consequently hydraulically seal the pressure chamber.

There are arranged between the threaded spindle 1 and the threaded nut 2 balls 7 (FIG. 3) which are arranged in a plurality of continuous ball channels 8. Each ball channel 8 is formed by means of ball grooves 9, 10 of the threaded nut 2 and the threaded spindle 1 which are wound in a helical manner about the spindle axis and redirection portions 11. The redirection portions 11 in each case connect a beginning and an end of a load portion 12 of a common winding.

The redirection portions 11 are in each case formed on a redirection piece 13. These redirection pieces 13 are distributed over the periphery and arranged axially one after the other in pocket-like recesses 14 of the threaded nut 2. The Figures show clearly the arrangement of the pocket-like recesses 14 radially inside the covering face of the threaded nut 2, that is to say, inside the wall thickness of the threaded nut 2.

The pocket-like recesses 14 consequently do not extend through the cylindrical sealing face 5 on the outer periphery of the threaded nut 2.

The Figures show clearly that the cylindrical sealing face 5 and the ball channels 8 are arranged so as to axially overlap each other.

Figure 3:
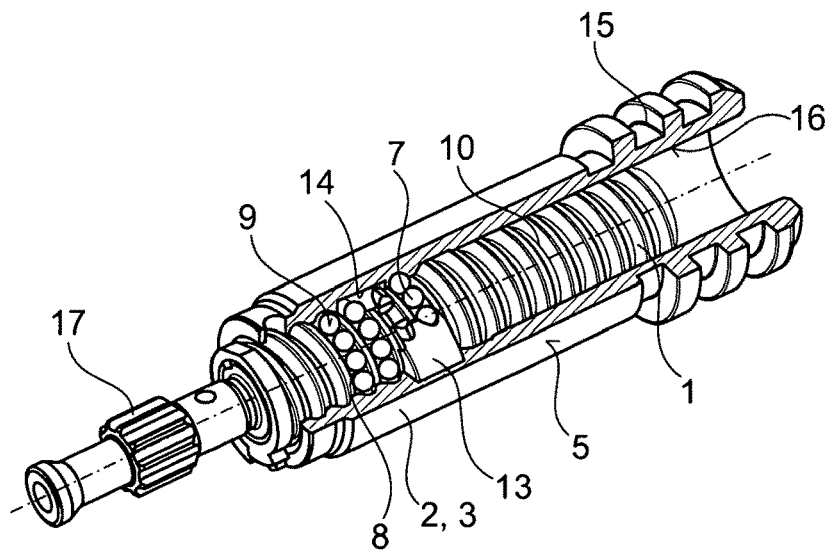
FIG. 3 is a perspective, broken-away illustration of an additional embodiment of a ball screw drive.

FIG. 3 shows another embodiment which differs from the embodiment described above substantially in that the threaded nut 2 which is constructed as a piston 3 is provided at the one axial end thereof on the outer periphery thereof with two annular grooves 15 which are arranged coaxially with respect to the spindle axis and in an axially adjacent manner for receiving sealing rings which are not depicted, wherein the annular grooves 15 are both arranged axially adjacent to the cylindrical sealing face 5.

Another difference from the first embodiment involves the threaded nut 2 being open in an axially continuous manner and provided on the inner periphery thereof with an inner cylindrical sealing face 16 which is arranged axially adjacent to the ball channels 8. This inner cylindrical sealing face 16 is arranged so as to axially overlap with the annular grooves 15. On this inner cylindrical sealing face 16, an inner piston which is not depicted may be guided so as to be able to be longitudinally displaced and may abut it in a sealing manner with the sealing rings thereof.

There is further formed in FIG. 3 at the left end of the threaded spindle 1 a pinion 17 which is provided with teeth and which can be driven by means of a drive wheel which is not depicted. Via the pinion 17 which is securely connected to the threaded spindle 1, the threaded spindle 1 is rotatably driven.

Figure 4:
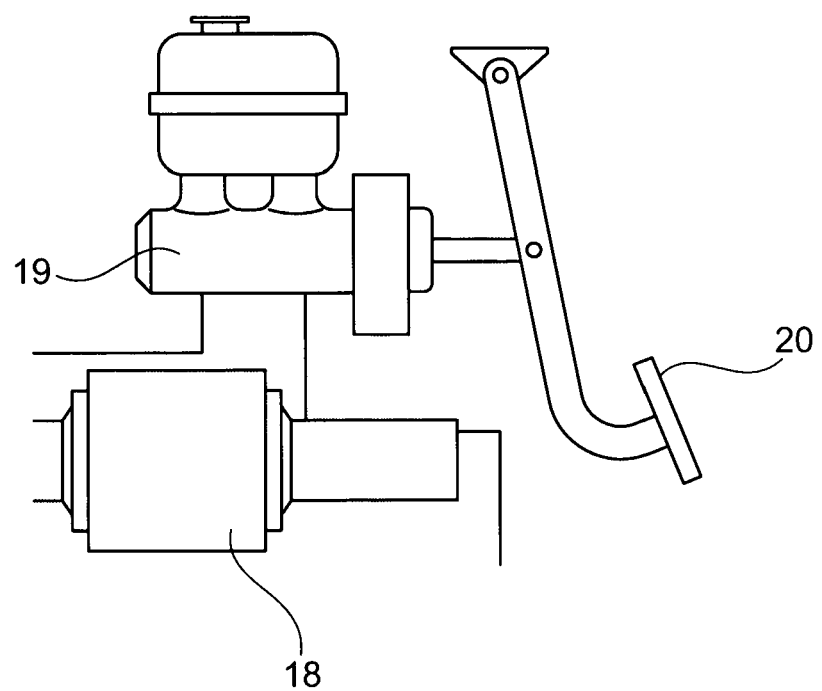
FIG. 4 is a schematic illustration of a cut-out of a braking installation of a motor vehicle with a brake booster.

FIG. 4 shows only schematically a cut-out of a brake installation of a motor vehicle. In this cut-out there is illustrated: a brake booster 18 with the ball screw drive as described, a main brake cylinder 19 and a brake pedal 20. The cylinder 4 which is indicated in FIGS. 1 and 2 is part of the brake booster 18.

The threaded nut 2 which is illustrated here is formed from a martensitically hardening steel which, on the one hand, has sufficient rolling strength for the operation of the ball screw drive and which, on the other hand, is corrosion-resistant with respect to brake fluid which is conventionally used in the electrohydraulic brake booster described. The threaded nut 2 is hardened and has a hardness of at least 55 HRC.

In the embodiment, there is used a steel which has the following materials in percent by weight: between 0.4% and 1.3% carbon (C), up to 2% silicon (Si), up to 2% manganese (Mn), between 12% and 20% chromium (Cr), up to 2% molybdenum (Mo), up to 0.2% vanadium (V), up to 3% nickel (Ni), and phosphorus (P) and sulphur (S) together at less than 0.015%, the balance being iron and where applicable melting-related impurities.

LIST OF REFERENCE NUMERALS

1 Threaded spindle
2 Threaded nut
3 Piston
4 Cylinder
5 Cylindrical sealing face
6 Sealing ring
7 Ball
8 Ball channel
9 Ball groove
10 Ball groove
11 Redirection portion
12 Load portion
13 Redirection piece
14 Pocket-like recess
15 Annular groove
16 Inner cylindrical sealing face
17 Pinion
18 Brake booster
19 Main brake cylinder
20 Brake pedal

The invention claimed is:

1. A ball screw drive comprising:
   a threaded nut having a ball groove which is formed on the inner periphery and which is wound in a helical manner about the spindle axis of the ball screw drive, wherein the threaded nut is constructed as a hydraulic piston, wherein the threaded nut is formed from a martensitically hardening steel which is non-corroding with respect to brake fluid and which contains in percent by weight:
   between 0.4% and 1.3% carbon;
   up to 2% silicon;
   up to 2% manganese;
   between 12% and 20% chromium;
   up to 2% molybdenum;
   up to 0.2% vanadium;
   up to 3% nickel;
   less than 0.015% phosphorus and sulphur together; and iron;
   a threaded spindle formed from a steel whose alloy element chromium constitutes a proportion of less than 12% by weight; and
   balls arranged between the threaded spindle and the threaded nut which roll on ball grooves of the threaded spindle and the threaded nut.

2. The ball screw drive as claimed in claim 1, wherein the martensitically hardening steel has a minimum hardness of 55 HRC.

3. A brake booster having a ball screw drive as claimed in claim 1, whose threaded nut is arranged in the cylinder so as to be able to be longitudinally displaced in order to carry out piston strokes, and whose threaded spindle is rotatably driven.

4. The brake booster as claimed in claim 3, whose threaded spindle is arranged in a space without contact with the brake fluid.

5. A ball screw drive comprising:
   a threaded nut having a ball groove which is formed on the inner periphery and which is wound in a helical manner about the spindle axis of the ball screw drive, wherein the threaded nut is constructed as a hydraulic piston, wherein the threaded nut is formed from a martensitically hardening steel which is non-corroding with respect to brake fluid, the martensitically hardening steel comprising:
   between 0.4% and 1.3% carbon;
   up to 2% silicon;
   up to 2% manganese;
   between 12% and 20% chromium; and
   iron;
   a threaded spindle formed from a steel whose alloy element chromium constitutes a proportion of less than 12% by weight; and
   balls arranged between the threaded spindle and the threaded nut which roll on ball grooves of the threaded spindle and the threaded nut.

6. The ball screw drive as claimed in claim 5, wherein the martensitically hardening steel contains less than 0.015% phosphorus and sulphur together.

7. The ball screw drive as claimed in claim 6, wherein the martensitically hardening steel further comprises up to 2% molybdenum.

8. The ball screw drive as claimed in claim 6, wherein the martensitically hardening steel further comprises up to 0.2% vanadium.

9. The ball screw drive as claimed in claim 5, wherein the martensitically hardening steel has a minimum hardness of 55 HRC.

10. A brake booster having a ball screw drive as claimed in claim 5, whose threaded nut is arranged in the cylinder so as to be able to be longitudinally displaced in order to carry out piston strokes, and whose threaded spindle is rotatably driven.

11. The brake booster as claimed in claim 10, whose threaded spindle is arranged in a space without contact with the brake fluid.

12. A threaded nut of a ball screw drive, having a ball groove which is formed on the inner periphery and which is wound in a helical manner about the spindle axis of the ball screw drive, wherein the threaded nut is constructed as a hydraulic piston, wherein the threaded nut is formed from a martensitically hardening steel which is non-corroding with respect to brake fluid, the martensitically hardening steel essentially consisting of:
- between 0.4% and 1.3% carbon;
- up to 2% silicon;
- up to 2% manganese;
- between 12% and 20% chromium;
- up to 2% molybdenum;
- up to 0.2% vanadium;
- up to 3% nickel;
- less than 0.015% phosphorus and sulphur together; and
- iron;
- a threaded spindle formed from a steel whose alloy element chromium constitutes a proportion of less than 12% by weight; and
- balls arranged between the threaded spindle and the threaded nut which roll on ball grooves of the threaded spindle and the threaded nut.

13. The ball screw drive as claimed in claim 12, wherein the martensitically hardening steel has a minimum hardness of 55 HRC.

14. The ball screw drive as claimed in claim 12, whose threaded spindle is arranged in a space without contact with the brake fluid.

* * * * *